United States Patent [19]

Portis et al.

[11] Patent Number: 5,269,342
[45] Date of Patent: Dec. 14, 1993

[54] T-FITTING

[75] Inventors: Ralph G. Portis, Highland Park; Robert H. Dean, Evanston, both of Ill.

[73] Assignee: Midland Manufacturing Corp., Skokie, Ill.

[21] Appl. No.: 24,753

[22] Filed: Mar. 2, 1993

[51] Int. Cl.⁵ ............................................. F16K 24/04
[52] U.S. Cl. ......................................... 137/588; 137/583; 137/614.11; 137/614.18; 137/849; 138/89
[58] Field of Search ............... 137/209, 212, 583, 587, 137/588, 614.11, 614.18, 849, 800, 317, 318; 138/89, 89.3; 141/95, 285; 220/89.1

[56] References Cited

U.S. PATENT DOCUMENTS

| | | | |
|---|---|---|---|
| 923,545 | 6/1909 | Madison | 138/89 X |
| 2,186,924 | 1/1940 | Hooper et al. | 137/588 X |
| 2,527,849 | 10/1950 | Ranney | 137/588 X |
| 2,781,728 | 2/1957 | Fischer et al. | 137/209 X |
| 2,904,081 | 9/1959 | Wolf et al. | 137/583 X |
| 3,438,397 | 4/1969 | Gilpin | 137/599 |
| 3,669,139 | 6/1972 | Gajdos | 137/317 |
| 3,762,432 | 10/1973 | Peterson, Jr. | 137/317 |
| 3,930,413 | 1/1976 | Laird et al. | 137/317 X |
| 4,144,901 | 3/1979 | Stevenson | 137/317 X |
| 4,269,230 | 5/1981 | Pepper | 138/89 |
| 4,347,863 | 9/1982 | Keyes | 137/212 |
| 4,370,919 | 2/1983 | Wagner et al. | 138/89 X |
| 4,649,948 | 3/1987 | Hudson | 137/318 X |
| 4,936,351 | 6/1990 | Wells et al. | 138/89 |
| 4,949,744 | 8/1990 | Heed et al. | 137/317 X |

OTHER PUBLICATIONS

Polaroid photographs of Midland Manufacturing Corp. fitting with portion of cap cutaway. Date unknown.

*Primary Examiner*—John Rivell
*Attorney, Agent, or Firm*—Emrich & Dithmar

[57] ABSTRACT

A T-shaped fitting for a port in the wall of a closed fluid system includes a branched tubular body having a proximal end coupled to the wall in fluid-tight communication with the port and two distal ends and defining passages between the proximal end and each of the distal ends. A flexible resilient membrane closes one of the distal ends and has a normally closed slit therein adapted for removably receiving an associated probe therethrough in sealing engagement therewith, while an insect screen is disposed across the other of the distal ends. Caps, tethered to the body, are respectively threadedly engageable with the distal ends. Two elastomeric seals are provided between one of the distal ends and its cap, channel means being provided in that one distal end to permit venting when the cap is partially removed. The other cap is sealed by means of a tapered thread.

11 Claims, 1 Drawing Sheet

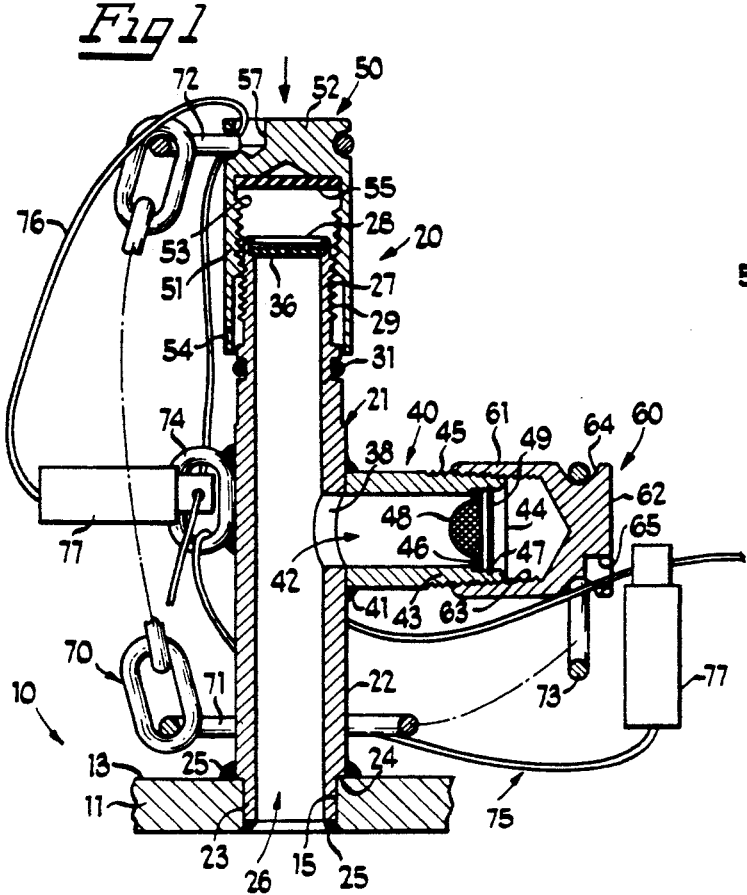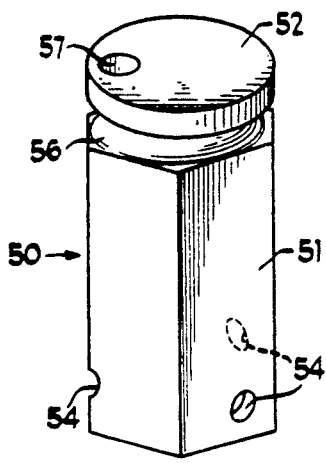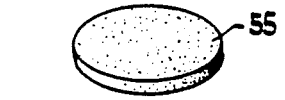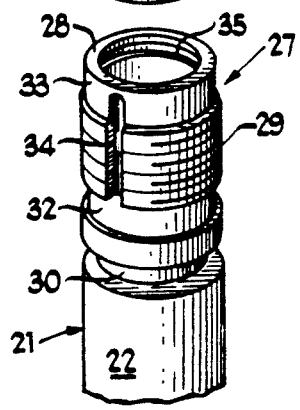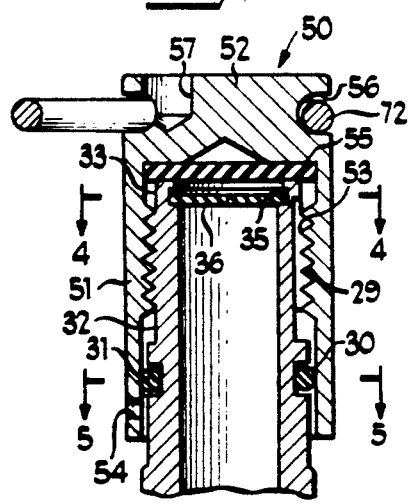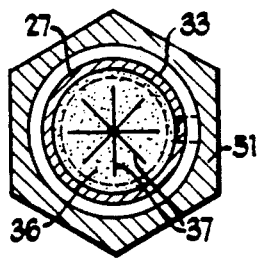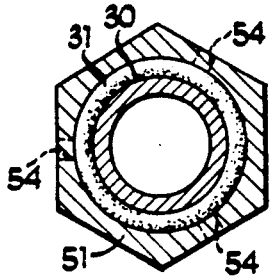

T-FITTING

BACKGROUND OF THE INVENTION

1. Field of the Invention

The present invention relates to fittings for a port in closed fluid systems for providing access to the port. The invention particularly relates to fittings of the type which permit insertion of a probe into the fluid system while the system remains in its closed state.

2. Description of the Prior Art

Many storage vessels, such as railway tank cars and the like, in addition to being provided with loading and unloading ports, are also provided with one or more access hatches for providing access to the interior of the vessel. Such access may be necessary, for example, to take the temperature of the lading in the vessel, to draw off a sample thereof, and the like. Also, it may be necessary to open the interior of the vessel to atmosphere in connection with unloading of the vessel. This has created difficulties in the past, since the hatches are of relatively large diameter and, while open, permit the entry of foreign matter which may contaminate the contents of the vessel. Furthermore, certain cargoes, such as molasses and corn syrup, e.g., are attractive to insects and, when the hatch is open, bees and other insects may enter the vessel and contaminate the cargo.

In order to alleviate these problems, special access fittings have been provided on vessels which permit access and yet do not require the opening of a large hatch. One such prior fitting is a simple tubular member which communicates with a small opening in the vessel wall and has its distal end closed by a cap. The cap may be removed to permit insertion of a probe, such as a thermometer for taking the temperature of the vessel contents, or a probe for the purpose of drawing off a sample of the cargo. The removal of the cap also opens the interior of the vessel to atmosphere to facilitate in unloading operations. Because the access opening to the tank is very small, the possibility of foreign material and insects entering the tank is reduced substantially, but it is not eliminated.

It is known to provide a screen or mesh over an access opening to prevent ingress of insects. However, this interferes with access to the interior of the vessel for the purposes of insertion of a probe, which would require removal of the screen or piercing it, the latter resulting in destroying the screen's effectiveness and/or allowing broken particles of the screen to fall into the vessel. It is also known to provide access ports or fittings with resilient plugs or seals provided with slits to permit the insertion of probe, while sealing around the probe. But such plugs interfere with communication of the interior of the tank with atmosphere or with external superatmospheric pressure sources for assistance in unloading operations.

SUMMARY OF THE INVENTION

It is a general object of the invention to provide an improved access fitting for a closed fluid system, which avoids the disadvantages of prior fittings while affording additional structural and operating advantages.

An important feature of the invention is the provision of a fitting of the type set forth which permits insertion of a probe while maintaining the system closed against entry of foreign material, and at the same time permits communication of the interior of the system with atmosphere or external pressure sources.

Another feature of the invention is the provision of a fitting of the type set forth which provides security against tampering.

Still another feature of the invention is the provision of a fitting of the type set forth which is of simple and economical construction.

A still further feature of the invention is the provision of a fitting of the type set forth which affords effective and reliable fluid-tight sealing between the fitting and an associated cap.

These and other features of the invention are retained by providing a fitting for a port in a wall of a closed fluid system to allow introduction of a probe into the system in its closed condition, the fitting comprising: a branched tubular body having a proximal end adapted to be coupled to the wall in fluid-tight communication with the port and two distal ends and defining passages between the proximal end and each of the distal ends, a flexible resilient membrane closing one of the distal ends and having a normally closed slit therein adapted for removably receiving an associated probe therethrough in sealing engagement therewith, and two caps respectively engageable with the distal ends for substantially fluid-tight closure of the passages thereat.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a view in vertical section through a fitting constructed in accordance with and embodying the features of the present invention, with caps in place, and with one of the caps in a non-sealing relationship with the fitting;

FIG. 2 is an enlarged fragmentary sectional view of the upper portion of the fitting of FIG. 1, illustrating the cap in its full sealing position;

FIG. 3 is an exploded perspective view of the cap and fitting portion illustrated in FIG. 2;

FIG. 4 is a view in horizontal section taken along the line 4—4 in FIG. 2; and

FIG. 5 is a view in horizontal section taken along the 5—5 in FIG. 2.

DESCRIPTION OF THE PREFERRED EMBODIMENT

Referring to FIG. 1, there is illustrated a portion of a vessel 10 and, in particular, a portion of an upper wall 11 thereof having an outer surface 13 and a cylindrical port 15 formed therethrough. The vessel 10 may typically be a fluid cargo tank, such as a railway tank car, but it will be appreciated that the principles of the present invention would apply to any fluid vessel and, indeed, to any closed fluid system.

Referring also to FIGS. 2 and 3, there is mounted on the vessel wall 11 a fitting 20 constructed in accordance with the present invention, the fitting 20 being generally T-shaped, and disposed with the stem of the "T" generally horizontal and its cross bar generally vertical in use. The fitting 20 has an elongated tubular body 21 having a substantially circularly cylindrical outer surface 22 provided with a reduced-diameter portion 23 at one end thereof to define an annular shoulder 24. The reduced diameter portion 23 is dimensioned to be received coaxially in the port 15 with the shoulder 24 seated against the outer surface 13 of the wall 11. The body 21 is fixedly secured to the wall 11, as by weldments 25, although it will be appreciated that other attachment means could be utilized. The tubular body 21 defines a cylindrical passage 26 extending from the proximal end of the body 21 at the port 15 to a distal end 27 which terminates in an annular end surface 28 and is externally threaded, as at 29. A circumferential groove 30 is formed in the outer surface 22 of the tubular body 21 a slight distance below the externally threaded portion for receiving an associated O-ring 31 formed of a suitable elastomeric material. The outer surface 22 of the tubular body 21 also has reduced outer diameter regions 32 and 33, respectively disposed immediately below and above the externally threaded portion 29, and with the region 33 extending to the annular end surface 28. A narrow longitudinal channel 34 is formed through the external threads 29 and extends between the reduced outer diameter regions 32 and 33, the channel 34 having a radial depth slightly greater than the depth of the threads 29.

Formed in the inner surface of the tubular body 21 closely adjacent to the end surface 28 is a circumferential groove 35 in which is seated the peripheral edge of a circular membrane 36, having a plurality of radial slits 37 therethrough intersecting at the center of the membrane 36. The membrane 36 is flexible and resilient, being preferably formed of a suitable elastomeric material, and is preferably rather thin, having a radius several times as great as its axial thickness. The membrane 36 cooperates with the tubular body 21 so that the slits 27 are normally closed for closing the distal end of the passage 26.

Formed radially through the tubular body 21 intermediate its ends is a circular side hole 38 which communicates with one end of a circularly cylindrical side tubular body 40, which is fixedly secured, as by weldment 41, to the outer surface 22 of the tubular body 21 coaxially with the hole 38. The tubular body 40 cooperates with the tubular body 21 to define a passage 42 extending from the port 15 to a distal end 43 of the tubular body 21, which terminates in an annular end surface 44 and is provided with an external tapered thread 45. The internal surface of the tubular body 40 has an enlarged-diameter portion adjacent to the distal end surface 44 which defines an annular shoulder 46. Formed in this enlarged-diameter portion between the shoulder 46 and the end surface 44 is a circumferential groove 47. A generally cup-shaped screen 48 has a circumferential flange which is seated against the shoulder 46, being retained in place by a retaining ring 49 which is seated in the groove 47. The mesh of the screen 48 is such as to prevent the ingress of insects and similarly-sized foreign material into the passage 42, while not substantially affecting the free flow of gas through the passage 42.

The fitting 20 includes caps 50 and 60 for respectively closing the distal ends of the tubular bodies 21 and 40. Referring also to FIGS. 4 and 5, the cap 50 has a tubular side wall 51 which is open at one end thereof and is unitary at the other end thereof with a relatively thick, circular, end wall 52. The side wall 51 preferably has a substantially circularly cylindrical inner surface and a hexagonal outer surface to facilitate the application of a tool, such as a wrench or the like. The inner surface of the side wall 51 has a reduced inner diameter portion intermediate its ends which is internally threaded, as at 53. Three equiangularly spaced-apart apertures 54 are formed through the side wall 51 adjacent to its open end. A circular elastomeric seal gasket 55, having a diameter substantially the same as the internal diameter of the side wall 51, is disclosed therein and seated against the end wall 52. The end wall 52 has a circumferential groove 56 formed in the outer surface thereof which communicates with a circular hole 57 formed in the end wall 52 and extending parallel to the longitudinal axis of the cap 50.

The side wall 51 of the cap 50 is dimensioned to be telescopically received in use over the distal end 27 of the tubular body 21 in threaded engagement therewith. The internal diameter of the side wall 51 is such that it is slightly greater than the outer diameter of the tubular body 21 and slightly less than the outer diameter of the O-ring 31 for sealing engagement therewith. When the cap 50 has been threaded completely down onto the tubular body 21, the annular end surface 28 of the tubular body 21 will be disposed in sealing engagement with the gasket 55, the length of the side wall 51 being such that, in this closed and sealed position, the apertures 54 will be disposed below the O-ring 31 (see FIG. 2). Thus, it will be appreciated that the O-ring 31 and the gasket 55, respectively, provide first and second fluid-tight seals between the cap 50 and the tubular body 21.

The cap 60 has an elongated tubular side wall 61, being open at one end thereof, and being closed by and unitary, at the distal end thereof, with a relatively thick, circular end wall 62. The inner surface of the side wall 61 is generally circularly cylindrical and is provided with a tapered internal thread 63, the outer surface of the side wall 61 preferably being hexagonal in shape to facilitate application of a wrench or the like. The end wall 62 has a circumferential groove 64 formed in the outer surface thereof, communicating with a circular hole 65 which extends into the distal end of the end wall 62 parallel to the longitudinal axis of the cap 60. It will be appreciated that the cap 60 is disposed for threaded engagement with the distal end 43 of the tubular body 40, the tapered threads 45 and 63 serving to provide a fluid-tight seal between the cap 60 and the tubular body 40.

The fitting 20 is provided with a tether chain 70 to prevent loss of the caps 50 and 60. More particularly, the tether chain 70 includes a base ring 71 which may be looped around the tubular body 21 below the tubular body 40 and being dimensioned so that it cannot be removed. In this case, the ring 71 must either be slipped over the tubular body 21 before it is welded to the vessel wall 11, or it must be welded shut after application around the tubular body 21. Alternatively, the ring 71 may be welded to the outer surface 22 of the tubular body 21. One length of the chain 70, designated by a dot-dash line in line in FIG. 1, extends from the base ring 71 to a loop 72 which is crimped around the circumferential groove 56 of the cap 50, while another length extends between the base ring 71 and a loop 73 crimped around the circumferential groove 64 of the cap 60. The crimps are such that the loops 72 and 73 are securely retained in the grooves 56 and 64, but permit free rotational movement relative to the caps 50 and 60.

The tubular body 21 is preferably also provided with a side loop 74, which is preferably a chain link welded to the outer surface 22 of the tubular body 21 immediately diametrically opposite the tubular body 40. If desired, the retaining chain 70 could be coupled to the side loop 74 instead of to the base ring 71.

The fitting 20 is also provided with a security seal assembly 75, which includes two lengths of wire 76, respectively looped through the holes 57 and 65 in the caps 50 and 60, and also both extending through the side loop 74. Each length of wire 76 has one end thereof fixedly secured to one part of an associated two-part seal cartridge 77, with the other end thereof extending through an opening in the second part of the seal cartridge 77, which is of a standard, commercially available type. The free end of each length of wire 76 is then pulled taut and the associated seal cartridge 77 is closed. Once the seals are closed, the caps 50 and 60 cannot be substantially moved from their closed, sealing positions, without breaking the security seals. Thus, tampering with the caps 50 and 60 will be evident.

In operation, if it is desired to unload the vessel 10, the cap 60 is removed to expose the passage 42 to atmosphere or, alternatively to permit coupling of the tubular body 40 to an associated source of superatmospheric pressure. The screen 48 will prevent insects or other similarly-sized foreign materials from entering the passage 42. The cap 50 need not be disturbed.

If it is desired to introduce a probe into the vessel 10, the cap 50 is removed, and the probe is inserted through the slits 37 in the membrane 36, which resiliently seals around the probe to prevent introduction of foreign material and to maintain the fluid system closed. It will be appreciated that the probe (not shown) could be a thermometer for sampling the temperature of the lading in the vessel 10 to determine whether or not it is appropriate for unloading, or, alternatively, a probe to draw off a sample of the lading. In this regard, it will be appreciated that neither the cap 60 nor any other coupling which might be made to the tubular body 40 need be disturbed during this operation.

On occasion, it may be desirable to simply relieve pressure in the vessel 10, without removing either of the caps 50 or 60. In this regard, the cap 50 may be simply unscrewed a few turns sufficient to unseat the seal gasket 55 from the end surface 28 of the tubular body 21, and to raise the cap apertures 54 above the O-ring seal 31, as illustrated in FIG. 1. In this position, the channel 34 in the tubular body 21 will provide communication between the passage 26 and atmosphere.

From the foregoing, it can be seen that there has been provided an improved fitting for a closed fluid system which is of relatively simple construction and which affords alternative access avenues to a single port in the system, which will accommodate insertion of a probe into the port while maintaining the system closed, or will permit simultaneous probe insertion and venting of the system to atmosphere.

We claim:

1. A fitting for a port in a wall of a closed fluid system to allow introduction of a probe into the system in its closed condition, said fitting comprising: a branched tubular body having a proximal end adapted to be coupled to the wall in fluid-tight communication with the port and two distal ends and defining passages between said proximal end and each of said distal ends, a flexible resilient membrane closing one of said distal ends and having a normally closed slit therein adapted for removably receiving an associated probe therethrough in sealing engagement therewith, and two caps respectively engageable with said distal ends for substantially fluid-tight closure of said passages thereat.

2. The fitting of claim 1, wherein said body includes a first tubular portion substantially coaxial with the port and defining one of said passages, and a second tubular portion extending substantially perpendicularly from said first tubular portion intermediate the ends thereof and cooperating with said first tubular portion to define said second passage.

3. The fitting of claim 1, wherein said membrane has a plurality of normally closed slits therein intersecting centrally of said membrane.

4. The fitting of claim 1 and further comprising screen means disposed in the other of said distal ends for preventing the entry of insects thereinto.

5. The fitting of claim 1 and further comprising tether means coupling said caps to said body and accommodating movement of said caps into and out of closing engagement with said distal ends.

6. The fitting of claim 1, and further comprising seal means providing fluid-tight seals between said caps and said distal ends when said caps are disposed in closing engagement with said distal ends, said seal means includes first and second seals associated with said one distal end.

7. The fitting of claim 6, wherein the cap associated with said one distal end includes a generally tubular side wall closed at one end thereof by an end wall, said first seal comprising an elastomeric ring disposed between said distal end and said cap side wall, and said second seal comprising an elastomeric gasket disposed between said distal end and said cap end wall.

8. The fitting of claim 7, and further comprising means providing threaded engagement between said one distal end and the associated one of said caps, an aperture formed in the cap associated with said one distal end, channel means formed in said one distal end providing communication between the associated one of said passages and said aperture in the associated cap when said cap is moved a predetermined distance from the closed condition thereof.

9. The fitting of claim 6, wherein each of said caps includes a generally tubular portion threadedly engaged with the associated one of said distal ends, said seal means including tapered threads on the other of said distal ends and the associated one of said caps.

10. The fitting of claim 1, and further comprising means for providing threaded engagement between said caps and said distal ends.

11. The fitting of claim 1, and further comprising security seal means coupling said caps to said body for providing an indication if an attempt is made to remove said caps from said distal ends.

* * * * *